United States Patent [19]

Grier et al.

[11] Patent Number: 4,843,762
[45] Date of Patent: Jul. 4, 1989

[54] VEHICLE DOOR WITH SPLIT OUTER PANEL

[75] Inventors: Donald A. Grier, Mt. Clemens; Theodore Nielson, Jr., Troy, both of Mich.

[73] Assignee: The Budd Company, Troy, Mich.

[21] Appl. No.: 50,507

[22] Filed: Apr. 14, 1987

[51] Int. Cl.⁴ .............................................. B60J 1/16
[52] U.S. Cl. ...................................... 49/378; 49/502; 296/146
[58] Field of Search ................ 49/374, 378, 372, 502, 49/501; 296/146

[56] References Cited

U.S. PATENT DOCUMENTS

| | | |
|---|---|---|
| 2,288,577 | 6/1942 | Trautvetter . |
| 2,658,790 | 11/1953 | Fish et al. . |
| 2,707,320 | 5/1955 | Fish . |
| 4,306,381 | 12/1981 | Presto . |
| 4,328,642 | 5/1982 | Presto . |
| 4,405,173 | 9/1983 | Piano . |
| 4,416,088 | 11/1983 | Feucht et al. . |
| 4,512,240 | 4/1985 | Mahler et al. . |
| 4,529,244 | 7/1985 | Zaydel . |
| 4,603,894 | 8/1986 | Osenkowski . |
| 4,606,148 | 8/1986 | Gandini . |

FOREIGN PATENT DOCUMENTS

| | | | |
|---|---|---|---|
| 0146186 | 6/1985 | European Pat. Off. | 296/146 |
| 2236678 | 2/1975 | France . | |
| 2579109 | 6/1986 | France | 296/146 |
| 0075827 | 4/1984 | Japan | 296/146 |
| 0171714 | 9/1984 | Japan | 296/146 |

Primary Examiner—Kenneth J. Dorner
Assistant Examiner—Gerald A. Anderson
Attorney, Agent, or Firm—Harness, Dickey & Pierce

[57] ABSTRACT

A split outer panel construction for a vehicle door includes an upper/outer panel member fixed to the window frame of the inner door panel. The lower edge of the upper/outer panel includes a fin which fits within a slot formed in the upper inboard edge of a removably attachable lower/outer panel member. Door hardware can be easily assembled onto the exposed inner panel prior to attaching the lower/outer panel to the door.

9 Claims, 2 Drawing Sheets

U.S. Patent  Jul. 4, 1989  Sheet 2 of 2  4,843,762
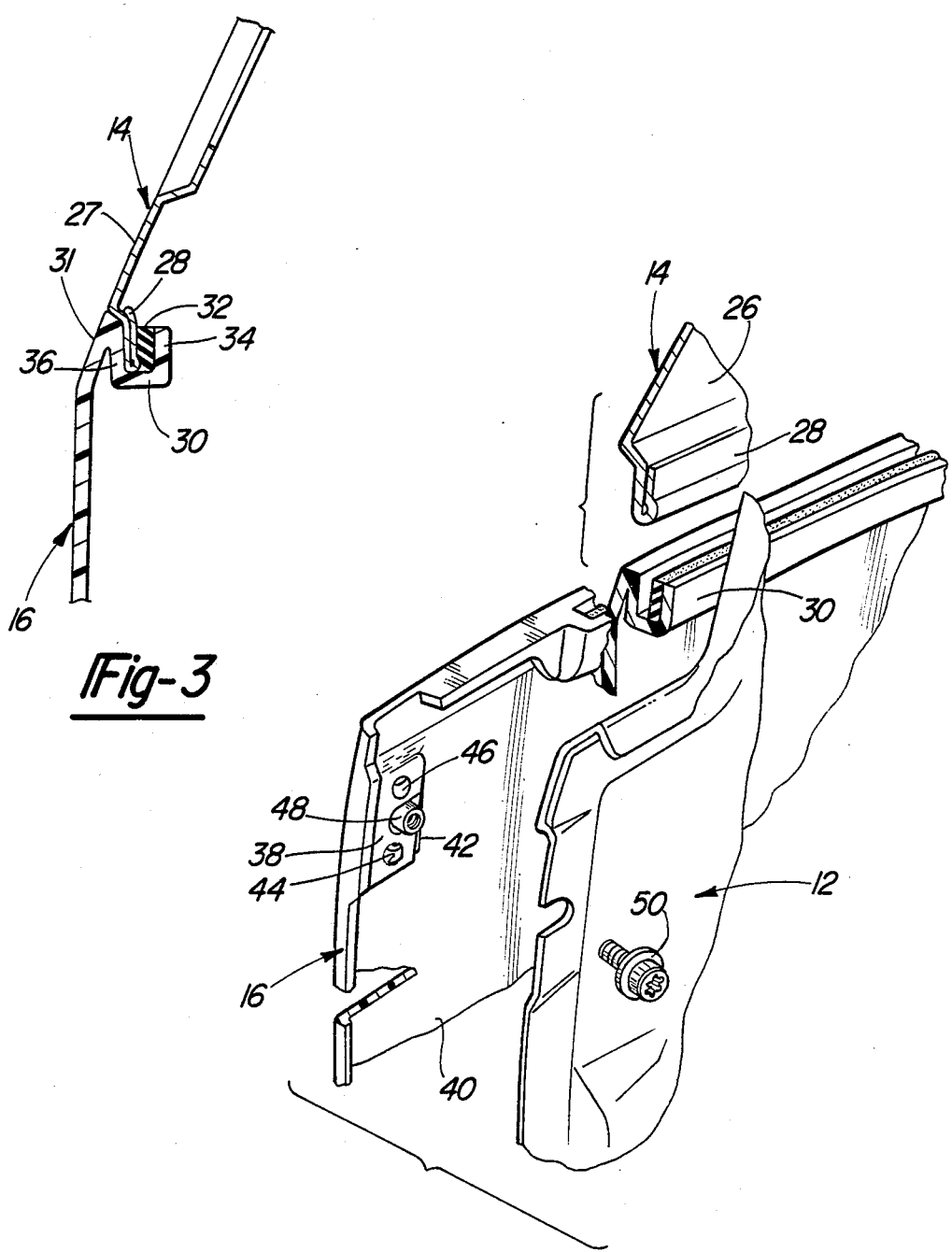

VEHICLE DOOR WITH SPLIT OUTER PANEL

BACKGROUND OF THE INVENTION

1. Technical Field

This invention relates to land vehicles and, more particularly, to doors for such vehicles.

2. Discussion

Although a variety of door constructions have been proposed in the technical and patent literature, conventional practice is for the door to include an inner and outer panel fixed together about its edges thereby forming a hollow shell in the interior lower portions thereof. The inner panel includes access openings to permit hardware such as window regulator mechanisms and the like to be inserted therethrough and attached during the typical on-line assembly process. Of course, this tends to be an awkward operation for the worker and can lead to improper installation.

SUMMARY OF THE INVENTION

According to the present invention, the outer panel is split into two parts: an upper/outer panel member and a lower/outer panel member. The upper/outer panel member covers the window frame portion of the inner panel and is attached thereto. On the other hand, the lower/outer panel is removably attached to lower portions of the inner panel and to the upper/outer panel member along adjacent longitudinal edges thereof. Accordingly, the door hardware can be assembled directly onto the exposed portions of the inner panel prior to attaching the lower/outer panel member.

In the preferred embodiment, the adjacent longitudinal edges of the upper and lower/outer panel members are connected by way of an elongated fin depending from the upper member which is held in an inboard slot formed in the lower member. This construction provides a solid, yet removably attachable fastening method which reduces vibration of the ultimate assembly and insures a cosmetic fit.

BRIEF DESCRIPTION OF THE DRAWINGS

The various advantages of the present invention will become apparent to those skilled in the art upon reading the following specification and by reference to the drawings in which:

FIG. 3 is a partial cross sectional view along the lines 3—3 of FIG. 2; and

FIG. 4 is a partial exploded perspective view with parts broken away illustrating the preferred mode of attachment of the various door parts.

DESCRIPTION OF THE PREFERRED EMBODIMENT

Figure 1:
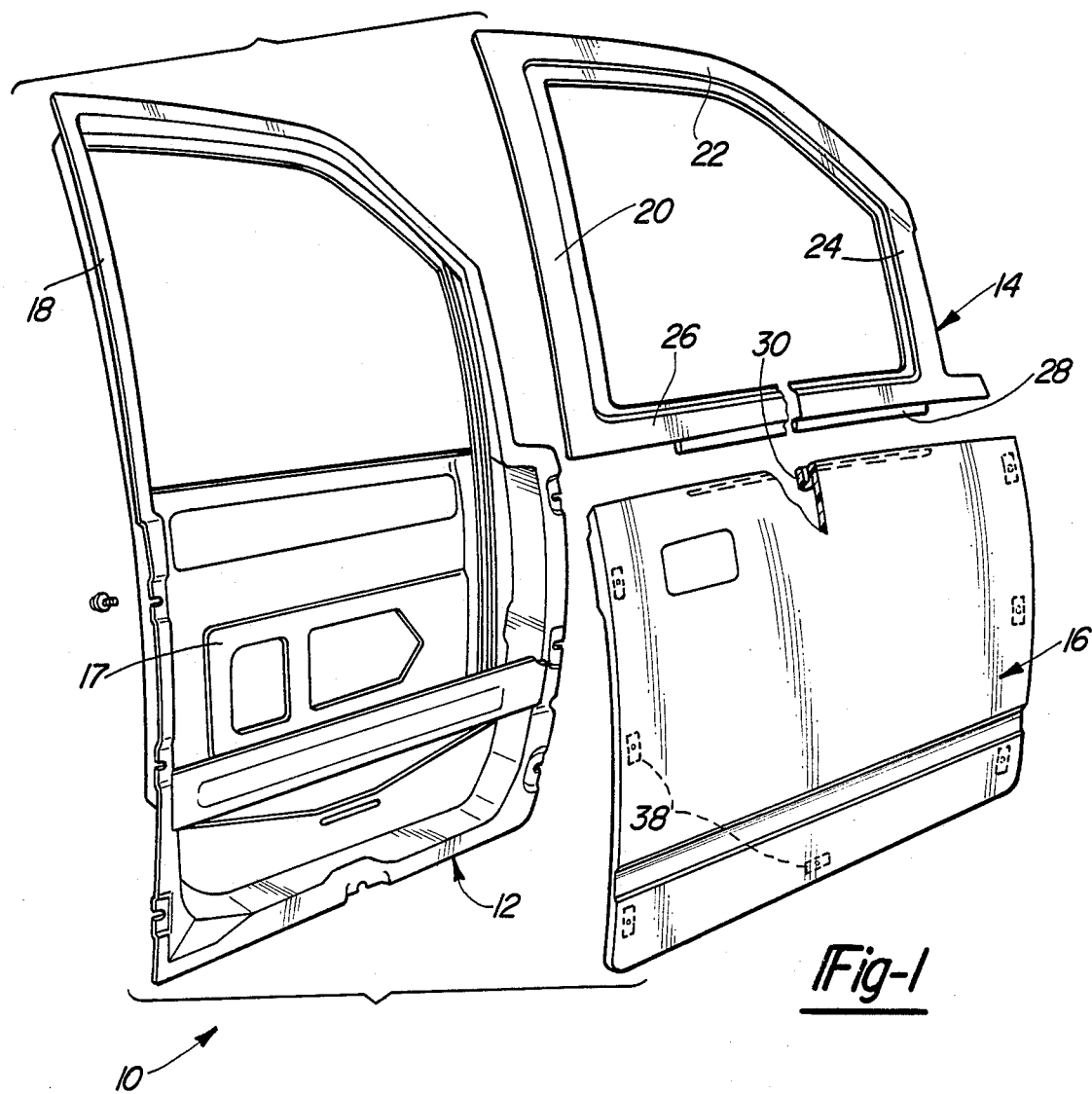
FIG. 1 is an exploded perspective view of a vehicle door made in accordance with the teachings of the present invention.

The vehicle door 10 of the present invention generally consists of three main parts: an inner panel 12 and a split outer panel consisting of an upper panel member 14 and a lower panel member 16. The inner panel 12 is fairly typical and generally is formed from a metal stamping defining a lower hollow shell portion 17 and an upper window frame portion 18. As is known in the art, the lower shell portion 17 is provided with suitable attachment means onto which hardware (not shown) such as window regulator mechanisms, door lock assemblies and the like are attached. The window frame portion 18 also includes weather stripping (not shown) and the like as is well known in the art.

The upper/outer panel 14 is defined by three sides 20, 22 and 24 (which generally correspond with the sides of window frame 18) and a lower edge 26 that runs along the longitudinal length of the door at the belt line. Pursuant to a feature of this invention, lower edge 26 includes a depending fin 28 located inboard of the plane of the outer face 27 of the edge 26 as seen most clearly in FIG. 3. Upper/outer panel 14, in this embodiment, is a sheet metal stamping and the fin 28 is formed by a reverse fold or Dutch hem as seen most clearly in FIG. 4.

Figure 2:
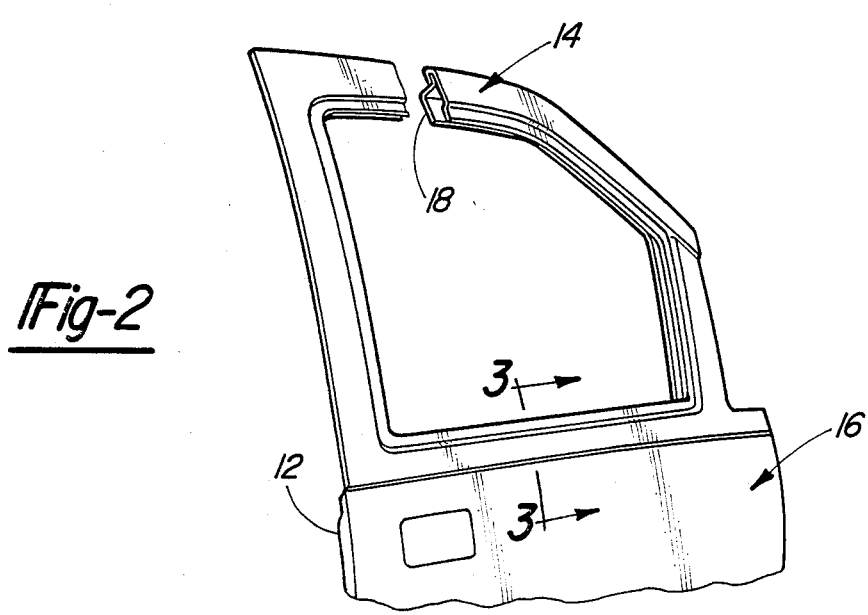
FIG. 2 is a partial perspective view of the completed door assembly with parts broken away.

According to the method of this invention, the upper/outer panel member 14 is attached to inner panel 12 so that member 14 encloses the window frame 18. This can be accomplished in any of a well known number of ways. Since upper panel member 14 is also a sheet metal stamping in this embodiment, conventional sheet metal attachment techniques can be used to permanently affix the two stampings together. In FIG. 2 the outer/upper panel member 14 is shown hemmed to the window frame 18 portion of inner panel 12.

It will be appreciated that the partially assembled door still permits the on-line assembly worker to have access to the interior cavity 17 for mounting the necessary door hardware. This is because the lower panel member 16 is not attached to the door until the hardware mounting operations have been completed. All such operations can be conveniently accomplished from the exterior of the vehicle thereby greatly facilitating the assembly process.

Once the door hardware has been assembled, the lower/outer panel member 16 is detachably fastened to the inner panel 12 and to the upper/outer panel member 14. Panel member 16 is preferably made from fiber-reinforced plastic and includes a pocket or slot 30 that is preferably integrally molded with the remainder of the panel and is located inboard from the outer face 31 thereof. A flexible seal 32 runs along the inboard wall 34 of slot 30. As can be seen most clearly in FIGS. 3 and 4, the space between seal 32 and the opposite wall 36 provides a receptacle for receiving the fin 28 of the upper panel member 14. The mating parts are dimensioned so that there is a rather tight fit substantially devoid of any relative movement which could cause rattling or other vibration related noise. Thus, the joint along the adjacent longitudinal edges of the upper 14 and lower 16 outer panel members is not only cosmetically pleasing but also provides a mechanically sound fit.

Attachment around the other three edges of the lower/outer panel member 16 can be accomplished by a variety of means. In the preferred embodiment, the plastic lower/outer panel 16 is provided with integral flanges 38 which are spaced from the inner surface 40 a sufficient distance to receive a tapping plate 42. The flange 38 has one or more openings 44 through which tangs 46 of plate 42 protrude thereby giving tapping plate 42 a certain range of adjustment. Plate 42 includes an internally threaded boss 48 for receiving the threaded shank of a fastener 50 whose enlarged head draws the inner panel 12 and lower/outer panel member 16 together upon tightening.

Those skilled in the art can appreciate that the present invention provides significant advantages over conventional door constructions and that modifications of the previously discussed preferred embodiment can be readily made without departing from the spirit of this invention after having the benefit of reading the foregoing specification and studying the drawings. Therefore, while this invention has been described in connection with a particular example, no limitation is intended thereby except as defined in the appended claims.

What is claimed is:

1. A vehicle door comprising:
   an inner door panel having an upper window frame portion and a lower cavity defined in part by front and rear side walls of sufficient depth to receive at least a window regulating mechanism therein;
   a split outer panel construction having an upper/outer panel member and a lower/outer panel member, the upper/outer panel member being fixed to the window frame portion of the inner panel;
   connection means for detachably connecting the lower/outer panel member to lower portions of the inner panel and to said upper/outer panel member along adjacent longitudinal edges thereof, said connection means being located interiorly of and hidden by longitudinally adjacent surfaces of the lower and upper outer panel members which are held together in abutting relationship by the connection means whereby the exterior of the door exhibits a substantially continuous exterior surface profile;
   whereby hardware can be assembled onto interior lower portions of the inner door panel prior to attaching the lower/outer panel member; and
   said connection means including a fin running longitudinally along a lower edge of the upper/outer panel member and depending downwardly therefrom between the side walls, and a receptacle on interior portions of the lower/outer panel between said side walls for receiving said fin, said connection being thus located within the lower cavity of the door.

2. The door of claim 1 wherein said receptacle comprises:
   a generally U-shaped pocket integrally formed from the same material as the lower/outer panel.

3. The door of claim 2 wherein said lower/outer panel is made of fiber reinforced plastic material.

4. The door of claim 3 wherein said receptacle includes resilient sealing means and cooperates with walls of the pocket to provide a substantially tight fit with the fin.

5. The door of claim 4 wherein said connection means further comprises:
   fastener means for securing vertical sides and the bottom of the lower/outer door panel member to the inner panel.

6. A vehicle door comprising:
   a stamped inner door panel having an upper window frame portion and a lower cavity defined in part by front and rear side walls of sufficient depth to receive at least a mechanism for regulating a window;
   an upper/outer panel member having substantially three sides generally corresponding in shape to the window frame portion of the inner panel, the upper/outer panel member further including a lower edge running substantially the longitudinal length of the door, said lower edge further including a depending fin located inboard of the plane of the outer face of the lower edge of the lower/outer panel and said fin extending between the side walls;
   means for permanently attaching the upper/outer panel member to the inner panel so that the upper/outer panel member covers the window frame portion while leaving the lower cavity of the inner panel exposed from the exterior to thereby permit workers outside the vehicle to assemble hardware onto the inner panel cavity;
   a lower/outer panel member having a pocket formed inboard from the outer face thereof and lying along a top edge of the lower/outer panel member and between said side walls, said pocket providing a receptacle for receiving the fin from the upper/outer panel member to thereby provide a detachable connection with a substantially tight fit therebetween for bringing the faces of the panels into abutting alignment and minimizing vibration related noise while covering the fin/pocket connection; and
   fastening means for securing the sides and the bottom of the lower/outer panel member to the inner panel.

7. The door of claim 6 wherein said inner panel and upper/outer panel member are stamped metal sections, with the lower/outer panel member being made of fiber-reinforced plastic.

8. The door of claim 6 wherein said pocket includes a flexible seal therein.

9. The door of claim 6 wherein said fastening means comprises a plurality of fastening areas disposed along peripheral portions of the lower/outer panel member, each of said fastening areas including:
   a flange spaced inboard from an inner face of the lower/outer panel member, said flange having one or more locating openings therein;
   a tapping plate at least partially lying in the space between the flange and the inner face; and
   a threaded fastener having a head engaging an inner face of the inner panel and a threaded shank portion engaging the tapping plate whereby rotation of the fastener from the interior of the vehicle draws the lower/outer panel member and inner panel together.

* * * * *